Feb. 7, 1956
A. GREFFE
2,733,989
PROCESS FOR REMOVING LEAD FROM ORES
Filed July 22, 1952
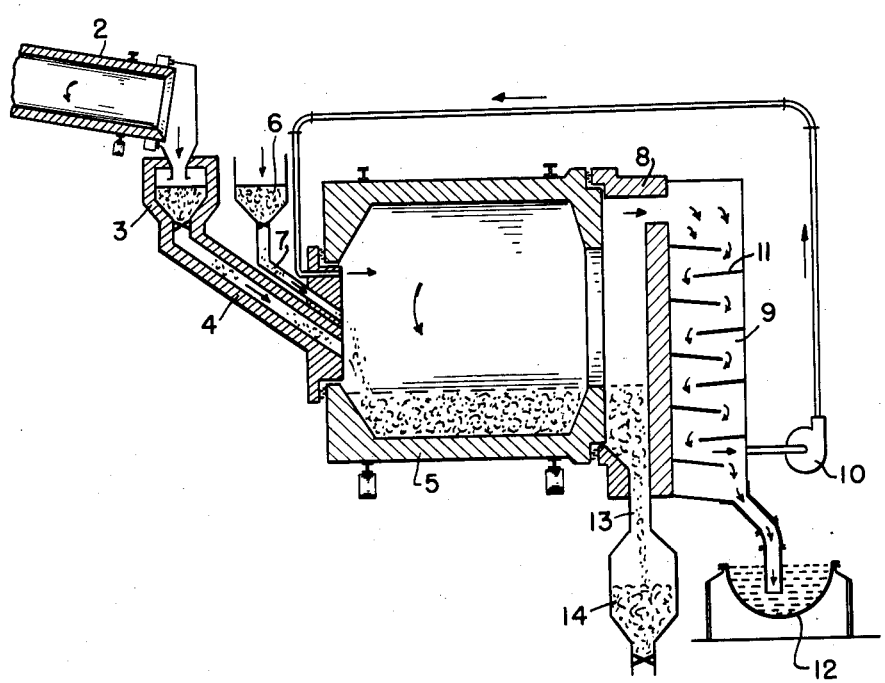
INVENTOR.
Andre Greffe
BY
HIS ATTORNEYS

2,733,989

PROCESS FOR REMOVING LEAD FROM ORES

André Greffe, Annecy (Haute-Savoie), France, assignor to Societe d'Electro-Chimie d'Electro-Metallurgie et des Acieries Electriques d'Ugine, Paris, France Application July 22, 1952, Serial No. 300,257

Claims priority, application France August 10, 1951

2 Claims. (Cl. 75—77)

There are some manganese ores which, because of their high lead content, cannot be directly used in the manufacture of ferro-manganese, This invention relates to a process for removing lead from such ores. One example of a manganese ore having a high lead content is a Moroccan ore having the composition:

|  | Per cent |
|---|---|
| $SiO_2$ | 5.40 |
| $Al_2O_3$ | 1.33 |
| PbO | 6.60 |
| $Mn_3O_4$ | 58.30 |
| $Fe_2O_3$ | 0.57 |
| CaO | 1.50 |
| MgO | 0.20 |
| BaO | 11.16 |
| S | 0.16 |
| Ignition loss | 14.00 |

A process is known for removing lead from ores containing lead oxide, which consists in heating a solid mixture of ore and carbon at a temperature suitable for reducing this oxide. In this process, the lead is carried away with the gaseous products of combustion of the fuel used in carrying out the heating operation and becomes reoxidized to lead oxide. The equipment for collecting this lead oxide must be of sufficient size to treat the whole volume of gas, which is very large, since it includes all of the gases resulting from the combustion of the coal or fuel oil used for heating the materials. The apparatus for collecting and filtering the gases therefore becomes very large and very costly. Furthermore, the dust thus recovered contains, in addition to lead oxide, all the ashes coming from the fuel and all the very fine particles carried away by the gaseous current. The percentage of lead oxide contained in the recovered dust is therefore relatively low. Since lead is present as an oxide and not in metallic form, and owing to its dilution by impurities, the value of the recovered lead is thus greatly diminished.

The accompanying drawing is a longitudinal section through one form of apparatus suitable for carrying out my process.

The present process is economical to operate and results in the extraction of lead in metallic form from ores containing lead oxide as an impurity, more particularly manganese ores.

In carrying out the present process, the pulverized ore is preferably preheated in a separate furnace to a temperature of about 1100° C. for instance. The thus preheated ore is then reacted with a reducing agent in a reaction chamber which is separate from the heating furnace and in which the atmosphere is maintained neutral or reducing, that is, non-oxidizing, and in which the pressure may be controlled. The lead formed by reduction of lead oxide is withdrawn in the vapor state from the ore and is condensed, preferably to a liquid, in a condenser, communicating with the reaction chamber.

In carrying out the process, it is desirable to preheat the ore in a continuously operating, fuel oil or pulverized coal heated normal type rotating furnace. The previously pulverized ore is introduced at one end of the furnace, the burner being located at the other end. At the exit end of the rotating furnace, the ore falls into a thoroughly heat insulated hopper. When treating the above mentioned Moroccan manganese ore, it should be at a temperature around 1100 to 1150° C. The preheated ore and a reducing agent are introduced into a substantially gas-tight reaction chamber which may be a rotating drum wherein the materials are mixed and the reaction is carried out. The reaction chamber may or may not be heated. The reaction chamber is connected to a cooled condensation chamber where lead is recovered in the liquid state.

Although the reducing agent used during the operation may be carbon, it is preferred that the reducing agent be of a rather strongly exothermic character so that additional or separate heating of the reaction chamber may be avoided. It is particularly advisable, in case manganese ore is being treated, to use as the reducing agent the basic metal of the ore, i. e., manganese, either as ferro-manganese or as manganese pig iron. Then the manganese oxide itself, formed by reduction of lead oxide, enriches the ore in manganese. Iron may be used for the reduction.

The reactions which occur are as follows:

(1) $Mn_3O_4 + Mn = 4MnO$
(2) $Mn_3O_4 + Fe = FeO + 3MnO$
(3) $PbO + Mn = Pb + MnO$
(4) $PbO + Fe = Pb + FeO$

The amount of reducing agent or agents to be introduced into the reaction chamber will vary with the chemical composition of the ore and its lead oxide content. For the above mentioned ore, the iron or ferro-manganese reducing agent is preferably around 5% by weight of the ore.

The atmosphere of the reaction chamber must be maintained reducing or neutral so that no reoxidation of the lead occurs. Reoxidation of the lead can be prevented by introducing a suitable gas and/or by suitably lowering the pressure.

Separation of lead as a vapor is promoted either by lowering the pressure in the reaction chamber or by creating a circulation of a neutral or reducing gas, or by combining both of these methods. Volatilization and elimination of lead from the reaction chamber are, of course, faster the lower the pressure in the reaction chamber and the stronger the current of neutral or reducing gas which is circulated through the reaction chamber. Nitrogen may be used advantageously as the gas which is circulated through the reaction chamber. The lead vapors which are carried away by the gaseous current or which are sucked away by a pump are condensed, preferably in the liquid state, on a cold wall of a condensation chamber which communicates with the reaction chamber and is maintained under non-oxidizing conditions.

When using a neutral or reducing gas, the reaction chamber and the condensation chamber must always be filled with the gas during the whole operation. The reaction chamber may be operated either under a certain pressure, which is suitable for preventing air from entering the apparatus, or on the contrary, the reaction chamber can be operated under partial vacuum, which allows lowering of the reaction temperature but which requires that the apparatus be thoroughly gas-tight in order to prevent entrance of air.

Referring to the drawing, the ore to be treated is heated in a rotating furnace 2, preferably to a temperature of about 1100–1150° C. The preheated ore discharges into a well insulated hopper 3, from which it passes through a conduit 4 into a reaction chamber 5. A reducing agent, for example ferro-manganese or iron powder or pulverized pig iron, is fed from a hopper 6 through a conduit 7 to the reaction chamber 5. The feed of preheated ore and reducing agent from the hoppers 3 and 6 are controlled by distributors which are not shown on the drawing.

The reaction chamber 5 is a rotating drum, the rotation of which secures suitable mixing of the ore and the reducing agent. The reaction chamber 5 rotates relative to a fixed member 8 located adjacent the exit end of the reaction chamber and which communicates with a condensation chamber 9. The reaction and condensation chambers are filled with nitrogen which is constantly recycled by means of a blower 10 in order to force the lead vapors into the condensation chamber. The lead vapor condenses on the baffles 11 and falls in liquid form into a contained 12. The ore from which the lead has been removed falls through a conduit 13 into a container 14.

The invention is not limited to the preferred embodiment but may be otherwise embodied or practiced within the scope of the following claims.

I claim:

1. In a process for removing lead from manganese ores containing lead oxide as an impurity, the steps comprising preheating the pulverized ore in a separate furnace, introducing the preheated pulverized ore and a reducing agent of the group consisting of manganese, iron and ferro-manganese into a reaction chamber having a non-oxidizing atmosphere, excluding oxidizing gas from all parts of the interior of the reaction chamber, reacting the lead oxide and reducing agent in the absence of carbonaceous fuel at a temperature which reduces the lead oxide to metallic lead and vaporizes the metallic lead but retains the ore in a solid state, withdrawing metallic lead in vapor form from the reaction chamber, condensing it in a non-oxidizing atmosphere and withdrawing the purified ore in the solid state from the reaction chamber.

2. A process according to claim 1, wherein a non-oxidizing gas is circulated through the reaction chamber to entrain and remove the metallic lead vapors from the chamber.

References Cited in the file of this patent

UNITED STATES PATENTS

| Number | Name | Date |
| --- | --- | --- |
| 1,069,085 | Huntington et al. | July 29, 1913 |
| 1,306,942 | Berglund | June 17, 1919 |
| 1,844,428 | Kohlmeyer | Feb. 9, 1932 |
| 2,247,823 | Somes | July 1, 1941 |
| 2,442,674 | Bardwell | June 1, 1948 |
| 2,668,760 | Breyer et al. | Feb. 9, 1954 |